April 22, 1952     E. J. MASTNEY     2,594,190

ELECTRICAL APPARATUS

Filed March 9, 1950

Inventor
Edward J. Mastney
by Robert L. Kahn
Attorney

Patented Apr. 22, 1952

2,594,190

UNITED STATES PATENT OFFICE 2,594,190

ELECTRICAL APPARATUS

Edward J. Mastney, Berwyn, Ill., assignor to Oak Mfg. Co., Chicago, Ill., a corporation of Illinois Application March 9, 1950, Serial No. 148,643

3 Claims. (Cl. 200—11)

This invention relates to an electrical apparatus and particularly to an electrical switch. The switch to which this invention relates is a rotary type, useful for switching a large number of circuits and is an improvement upon the switch disclosed and claimed in Patents 2,012,492; 2,186,949 and 2,186,950. The switch to which this invention generally relates has for each section thereof, a wafer-like stator carrying a number of fixed contacts disposed thereon and arranged generally circularly around the center of the stator. Within an open region formed in the stator is a thin rotor disc carrying a number of arcuate contacts of desired angular extent and adapted to cooperate with the fixed contacts. A suitable index mechanism cooperates with a shaft to turn one rotor for each switch section through desired angles for obtaining any desired switching action.

Due to the increasing complexity of circuits in television receivers, various types of radio receivers and in such devices as vacuum tube testers, it is desirable to endow each switch section of a gang switch with as much switching action as possible. In addition thereto, it is necessary that each switch section have adequate insulation consistent with potentials used in the aforementioned devices.

The invention hereinafter described, improves upon the structures disclosed and claimed in the above identified patents by providing a laminated stator structure for each switch section. This laminated structure consists of two thicknesses of insulation, each thickness being so designed that the composite structure may carry almost twice as many stator contacts as before.

Figure 1:
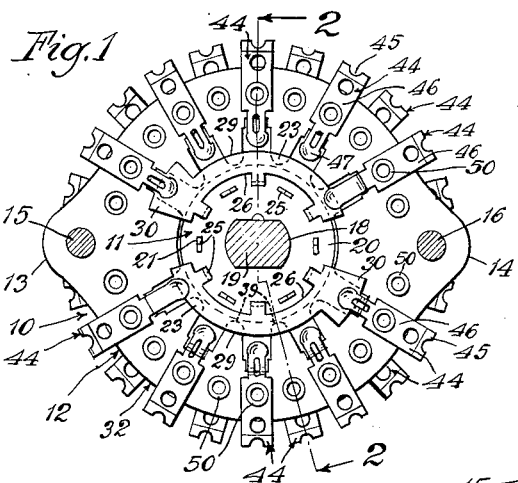
Figure 2:
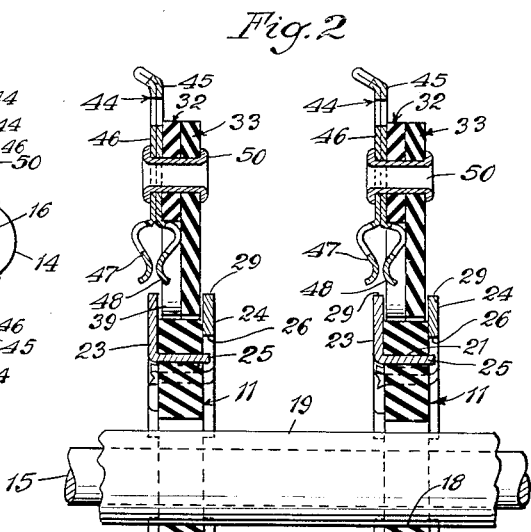
Figure 3:
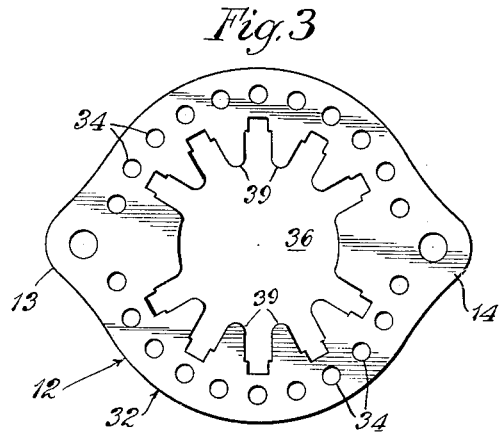
Figure 4:
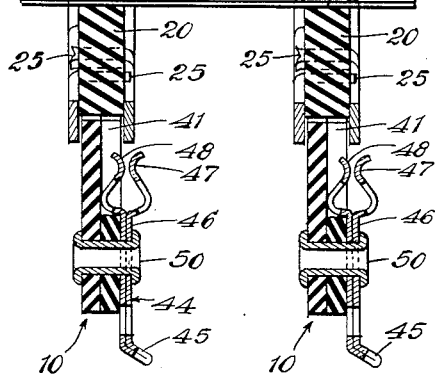

In order that the invention may be fully understood, it will now be explained in connection with the drawings wherein Figure 1 is a front elevation of a switch section embodying the present invention with the supporting means and shaft being shown in section. Figure 2 is a sectional view along broken line 2—2 of Figure 1 showing two sections of a gang switch embodying the present invention. Figure 3 shows an elevation of one part of the stator and Figure 4 shows an elevation of the other part of the stator.

Each switch section comprises a stator generally indicated by numeral 10 and a rotor generally indicated by numeral 11. The stator has generally circular body portion 12 and diametrically opposed wing portions 13 and 14. Wing portions 13 and 14 are suitably apertured to accommodate elongated supporting rods 15 and 16 respectively. As indicated in the patents referred to above, means such as sleeves around rods 15 and 16 may be used for maintaining the switch sections in predetermined relationship to each other.

Rotor 11 has non-circular aperture 18 through which a shaft of corresponding shape passes. Thus, shaft 19 is rotatively locked to the rotor but permits the rotor to move longitudinally of the shaft.

One or more switching sections may be ganged together with a suitable index means so that the shaft may be turned through a predetermined angle for obtaining desired switching. The rotor construction disclosed here is generally similar to that in the prior patents referred to. This rotor consists of disc 20 of insulating material such as Bakelite or the like. Disc 20 has a series of slots 21 arranged in an annular zone near the edge of the disc. Slots 21 are preferably elongated and disposed at regular intervals. Carried by disc 20 on either or both sides are rotor contacts 23 on one side and 24 on the other. These rotor contacts are flat annular strips of metal having inwardly extending mounting tongues 25 adapted to pass through one or more of slots 21.

As disclosed in said patents, rotor contacts 23 and 24 have their inner edge 26 spaced beyond the annular region in which slots 21 lie. Tongues 25 extend inwardly of the contacts and are bent to pass through slots and may be staked upon the other side of the disc. The angular extent of a rotor contact may be made as small or as great as desired. In general, however, each rotor contact will have adjacent mounting fingers spaced double the distance between adjacent slots 21. Thus, adjacent mounting fingers 25 of any one rotor contact will engage non-adjacent mounting slots. The outer edge 29 of the rotor contact may be as far as desired beyond the edge of the rotor disc. Certain portions of the rotor contact as part 30 may extend beyond the main body of the contact in order to increase the switching combinations.

Rotor contacts 23 and 24 on opposite sides of the rotor mounting disc are angularly staggered with respect to each other so that the mounting fingers of one contact will not interfere with the mounting fingers of the contact on the opposite side of the disc. Thus, rotor contacts may be mounted on opposite sides of the disc and be insulated from each other.

Cooperating with the rotor thus far described, is stator 10 consisting of two insulating discs 32 and 33 respectively, shown in Figures 3 and 4.

These two stator discs are made of Bakelite or other similar insulating material and are alike in some respects. Both have wing portions 13 and 14 suitably apertured as described above. Both stator discs have series of apertures 34 and 35 respectively. These apertures are adapted to register when the two stator discs are properly aligned.

As shown in Figures 3 and 4, series 34 and 35 consist each of twenty-two apertures disposed on the arc of a circle and spaced 15 degrees apart except at wings 13 and 14. At these wings, no apertures in series 34 and 35 are provided. However, it is understood that wings 13 and 14 may extend out further than shown so that adequate space may be provided for two additional apertures to provide a uniform series of apertures in each stator disc. The 15 degree separation between adjacent apertures is merely exemplary.

Discs 32 and 33 have central circular regions 36 and 37 for accommodating rotor disc 20. It is understood that the combined thickness of discs 32 and 33 is substantially equal to the thickness of rotor disc 20. This is not essential but is convenient.

Referring to stator disc 32, region 36 is formed by a series of tongues 39 spaced from each other at twice the angle existing between adjacent apertures in series 34. It is understood that the 30 degree spacing opposite the wings 13 and 14 is disregarded. Any one of tongues 39 is disposed inwardly of region 36 and in line radially with an aperture in series 34. Thus disc 34 has ten tongues 39, equally spaced from each other except at the wings where a double space is provided.

Referring now to disc 33, this has a series of tongues 41 similar to tongues 39 having the same angular separation as disc 39, namely 30 degrees. However, tongues 41 in disc 33 are oriented differently than tongues 39. As may be observed, tongues 41 are angularly staggered by one-half the angular distance between adjacent tongues, namely 15 degrees from tongues 39. Thus in Figure 4, the separation between adjacent tongues is the same even at the wings, this separation being 30 degrees. In disc 33, consequently there are 12 inwardly extending tongues.

By superimposing disc 33 on 32 in proper aligned relation, it will be apparent that tongues 39 will occur where a space is provided in disc 33 and tongues 41 in disc 33 will occur where a space is provided between tongues in disc 32.

A number of stator contacts generally indicated by numeral 44 are mounted. Each stator contact consists of connecting portion 45, mounting portion 46 and oppositely bent contacting portions 47 and 48. These stator contact clips are generally similar to the contact clips disclosed in the above identified patents. Other contact clips may be used if desired. Each stator contact clip 44 is secured to both discs 32 and 33 by eyelet 50. Instead of an eyelet, any other suitable fastening means, such as staking, may be used. The diameter of eyelet 50 is such that eyelets in adjacent apertures 34 will clear each other. Adjacent eyelets will have stator contacts on opposite sides of the stator, thus permitting ample clearance for the stator contacts on the stator material.

It is obvious that as many or as few stator contacts may be provided as may be found desirable. A variation in the number, disposition of stator contacts as well as the number and disposition of the rotor contacts makes a wide variety of switching combinations possible. Certain stator contacts may be made shorter than others and not extend inwardly to clear edge 29 of the rotor contact but engage extension 30. This expedient is well known and disclosed in the patents referred to above.

It will be noted that contact portions or jaws 47 and 48 on each stator contact are proportioned so that they may lie within the space defined between adjacent tongues of the stator disc upon which it happens to be mounted. Thus, by proper proportion of the thickness, size of contact jaws, thickness of rotor disc and the like, it is possible to have the plane of the rotor contacts lie in the plane defined by the stator contact jaws on one side of the stator. The same is true of the other side of the stator.

Index means having a 15 degree index action for the section described above may be provided, such index means being well known in the art. It is understood that instead of a 15 degree index action, any other angular spacing between adjacent index positions may be selected. It is also understood that stator disc 32 and stator disc 33 may be symmetrical circularly and have series 34 and 35 of the apertures and tongues 39 and 41 uniformly spaced around the entire inner region.

It is also possible to have a number of complete switch sections mounted to form a gang switch. While the invention has been illustrated and described in connection with a rotary switch, it is evident that it may be equally well applied to a linear type switch wherein the movable element travels in a straight line. Such a switch is generally illustrated in Patent 2,196,433.

It is understood that the rotor construction may be varied to suit individual requirements.

What is claimed is:

1. A switch having an insulating flat stationary portion and an insulating flat portion relatively movable to said stationary portion over a predetermined range, said stationary insulating portion consisting of two flat layers of insulating material, each layer having a series of mounting apertures extending along the range of movement of the movable part, the apertures in said two layers of material registering when said two layers are assembled to form one composite assembly, said two layers of material having free edge portions facing the movable insulating material and shaped to provide a series of tongues with spaces between adjacent tongues, the tongues on each of said two layers being spaced at twice the distance between adjacent mounting apertures so that each layer has a tongue and adjacent space for adjacent mounting apertures, the tongues of one layer being displaced from the tongues of the other layer by the distance between adjacent mounting apertures so that a tongue in one layer registers with a space between tongues in the other layer when the two layers are assembled, contacts carried by the two-layer assembly, means for mounting said contacts to assembly at said mounting apertures, contacts carried at adjacent mounting apertures being disposed on opposite sides of the two-layer assembly, each of such contacts having opposed jaws relatively movable normal to the assembly with one jaw lying in the space between adjacent tongues for the layer upon which said contact lies, blade-like contacts mounted upon said movable insulating part, said blade-like contacts lying in the plane of movement and being adapted to slide between the stationary contact jaws whereby a switch of predetermined dimension may have a large number of contact positions without impairing the insulating qualities of the switch.

2. An electric switch of the rotary type comprising a flat two-layer insulating stator having interior portions cut out, an insulating rotor disc disposed within said interior cut out portion, said rotor disc carrying blade-like contacts lying in planes parallel to the rotor disc, said rotor disc being movable around its center for switching purposes, each layer of said stator having a series of regularly spaced mounting apertures, the apertures in both series registering, said two layers of insulating material having inwardly extending tongues, each tongue and adjacent space corresponding to adjacent mounting apertures, the tongues of one mounting layer being staggered with respect to the tongues on the other mounting layer by a distance substantially equal to the distance between adjacent mounting apertures so that the tongue of one layer overlies the space between tongues of the other layer, contacts carried by the two-layer assembly, means for securing said contacts at mounting apertures with the contacts at adjacent mounting apertures lying on opposite sides of the two-layer stator, each stator contact extending inwardly toward the rotor and having a pair of opposed jaws movable along a line generally perpendicular to the plane of the stator with said jaws generally registering with the intertongue space corresponding to the mounting aperture for said contact, said stator contact jaws being adapted to enclose the rotor contact blades on opposite sides thereof whereby a rotary switch having a large number of switch positions is possible.

3. The switch of claim 2 wherein said two-layer stator has wing portions for mounting said stator.

EDWARD J. MASTNEY.

REFERENCES CITED

The following references are of record in the file of this patent:

UNITED STATES PATENTS

| Number | Name | Date |
|---|---|---|
| 2,064,157 | Franklin | Dec. 15, 1936 |
| 2,067,552 | Taylor | Jan. 12, 1937 |
| 2,128,279 | Allison | Aug. 30, 1938 |